Figure 1:
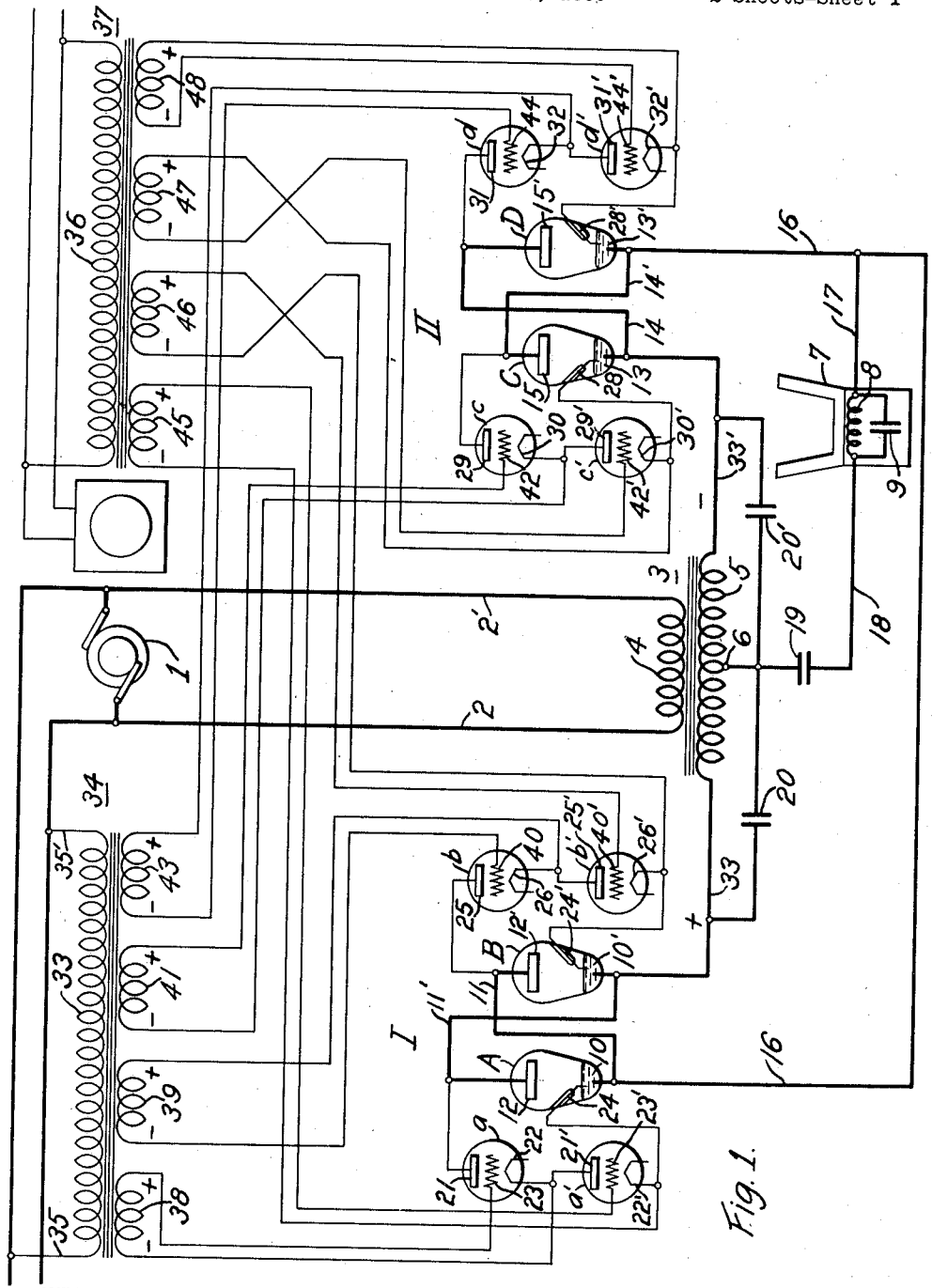

Jan. 14, 1941.  J. SLEPIAN  2,228,412
HIGH FREQUENCY HEATING SYSTEM
Filed Jan. 18, 1939  2 Sheets-Sheet 1

WITNESSES:
Wm. B. Sellers.
F. S. Bartholf

INVENTOR
Joseph Slepian.
BY
F. W. Lyle.
ATTORNEY

Jan. 14, 1941.         J. SLEPIAN         2,228,412
HIGH FREQUENCY HEATING SYSTEM
Filed Jan. 18, 1939         2 Sheets-Sheet 2

WITNESSES:

INVENTOR
Joseph Slepian.
BY
ATTORNEY

Patented Jan. 14, 1941

2,228,412

UNITED STATES PATENT OFFICE 2,228,412

HIGH FREQUENCY HEATING SYSTEM

Joseph Slepian, Pittsburgh, Pa., assignor to Westinghouse Electric & Manufacturing Company, East Pittsburgh, Pa., a corporation of Pennsylvania Application January 18, 1939, Serial No. 251,539

14 Claims. (Cl. 171—97)

This invention relates to power conversion systems, and more particularly to an arrangement for converting alternating current power of commercial frequency to alternating current energy of higher frequency.

High-frequency energy of large power finds extensive application in various fields of industry. Rotary machines for generating high-frequency currents have very limited power output capacities and are costly as well as difficult to produce. The generation of high-frequency energy for industrial applications has heretofore been accomplished by vacuum tube oscillators and amplifier arrangements which entail large and expensive equipment at the same time operating at relatively low efficiency.

The primary object of this invention is to generate high frequency energy at comparatively high efficiency with a minimum number of components by conversion of available commercial frequency power to higher frequency alternating current.

A further object of this invention is to provide a simple converter circuit arrangement utilizing variable current conductive devices and means for controlling the conductivity thereof at a predetermined frequency.

A particular feature of this invention is that the control of current conductive devices is effected without moving parts and with relatively small losses between the primary input power and the load circuit.

The high efficiency of the frequency converter in accordance with this invention is obtained by employing ignitron rectifiers in a novel circuit arrangement to control the direction and the rate of flow of current between supply and load circuits.

Under the term "ignitron" it is to be understood here the type of vapor arc rectifier having two main electrodes in the form of a cold cathode and an anode and an auxiliary starting electrode known as the make-alive electrode which functions in such manner as to neutralize the cathode reluctance by creating a cathode spot and thereby initiating the formation of an arc discharge between the main electrodes when the cathode is negative with respect to the anode. Rectifiers of the type above-mentioned are well known in the art and have been extensively described by the inventor herein named, for instance, in United States Patent No. 2,069,283 and in publications such as the Electrical Journal, June, 1936, pages 267 and 272.

Other features and advantages will become evident from the following description of the invention defined in particularity in the appended claims, taken in connection with the accompanying drawings.

Figure 2:
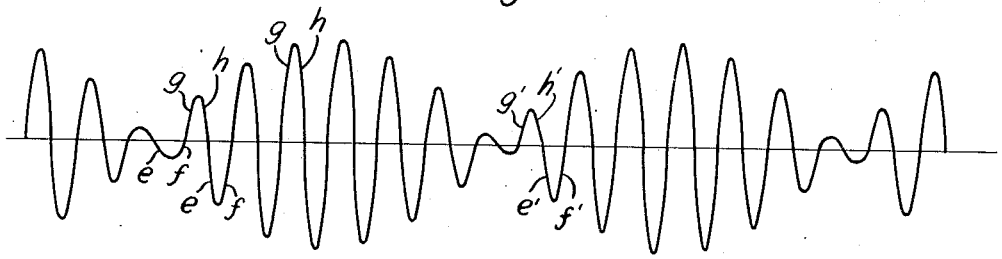
Figure 3:
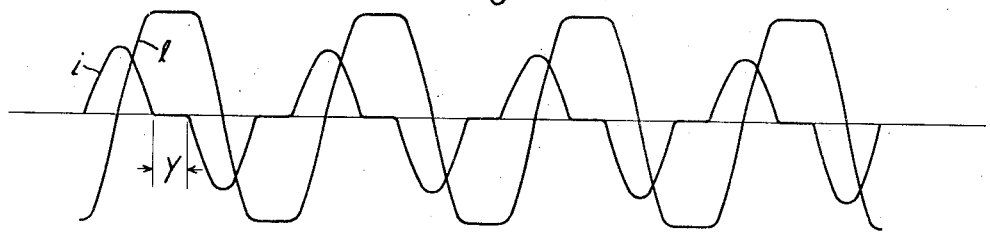
Figure 4:
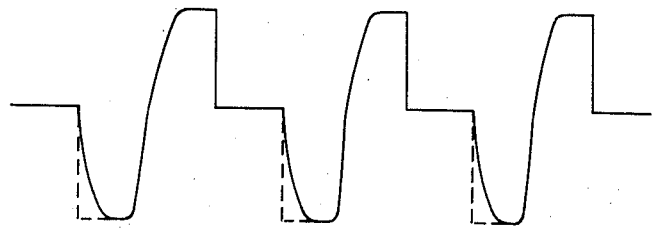

In the drawings:

Figure 1 shows a circuit arrangement utilizing ignitron rectifiers connected between a supply circuit and a load circuit in bilateral relation of conductivity, Fig. 2 shows the high frequency current output into the load circuit, Fig. 3 is a curve indicating voltage and current in a particular portion of the circuit shown in Fig. 1, and Fig. 4 shows a desired voltage curve across the ignitron rectifiers due to certain components in the conversion system.

The application of high frequency-currents for heating such as in high frequency furnaces requires large currents which are especially difficult to produce at frequencies of approximately 1000 cycles or higher. The description of this invention and the illustration thereof in the circuit of Fig. 1 was, therefore, chosen in connection with high frequency furnace application. It is to be understood, of course, that in any other fields of industrial use the arrangement of frequency conversion described herein may as well be employed.

Briefly, the invention comprises the utilization of primary commercial frequency power to supply a load circuit of a higher frequency than the available commercial power line. This is accomplished by arranging between the load circuit and the power supply source current controlling devices such as ignitron rectifiers and control means therefor determining the sequence and rate of operation of said devices and means for energizing certain of the control devices associated with the rectifiers at the frequency of the supply line and others of the control means at the frequency desired to be generated.

Referring to Fig. 1, the alternator 1 schematically shown is the source of commercial frequency power, supplying through conductors 2 and 2' the utilization circuit consisting of a power transformer 3, the primary 4 of which is connected to the conductors 2 and 2'. The secondary winding 5 thereof is center tapped at 6 and supplies power to a load circuit which is schematically shown as a high frequency furnace 7 including the high frequency inductance 8 tuned by capacitance 9. The secondary winding 5 is arranged in such manner as to form a divided output circuit wherein the load 7 is symmetrically disposed between branches and the midpoint 6 of the winding 5. Serially interposed in each branch are ignitron rectifiers A, B and C, D, respectively. Each pair of rectifiers is connected in bilateral relation of conductivity, the cathode 10 of rectifier A being connected by means of conductor 11 to the anode 12' of rectifier B and the cathode 10' of the latter through conductor 11' to the anode 12' of the former. Rectifiers C and D are similarly interconnected. The cathode 13 through conductor 14 to anode 15' and the cathode 13' through conductor 14' to the anode 15. The circuit is completed to the load through conductor 16 interconnecting cathode 10 of rectifier A with cathode 13' of rectifier D and through conductor 17 to one terminal of the inductance 8, the other being connected by means of conductor 18 and series capacity 19 to the midpoint 6 of the secondary winding 5. Each half of the secondary winding 5 is bridged also by capacitors 20 and 20', respectively, the function of which shall be explained later.

Each of the ignitron rectifiers is provided with control means for the initiation of current flow between their respective anodes and cathodes which comprises here two control tubes in series between each rectifier anode and make-alive electrode. Tubes a and a' having anodes 21 and 21', cathodes 22 and 22' and control electrodes 23 and 23' are arranged between make-alive electrode 24 and anode 12 of rectifier A, the anode 21' of tube a' being connected to the cathode 22 of tube a. The second ignitron rectifier B in this branch circuit includes a similar arrangement of control tubes as well as rectifiers C and D, of the second branch circuit.

In order to simplify the description of the circuit the first group of rectifiers are marked by the roman numeral I and the second group by numeral II, and each rectifier is identified by capital letters A, B, C and D, respectively. The control tubes associated with each rectifier are marked with the corresponding small letters of the alphabet and a primary index is affixed to the second one.

Group I includes rectifiers A and B. The anode 12 of rectifier A is connected with the cathode 10 of rectifier B and vice versa, the anode 12' of the latter with the cathode 10 of the former. By this connection bilateral conductivity is obtained for both half cycles of alternating current provided that all other conditions required for conductivity are maintained, that is, the make-alive electrode of the particular rectifier energized at the time when the anode of the rectifier is positive with respect to its cathode. This is accomplished as will be seen in connection with the description of the operation of the circuit by the proper energization of the make-alive electrodes by the associated control tube. Following the circuit, it is seen that between anode 12 and make-alive-electrode 24 of the rectifier A in series relation are interposed two control tubes a and a'. The anode 21 of tube a connects with the anode 12 of rectifier A. The cathode 22 of tube a and the anode 21' of the tube a' are interconnected and the cathode 22' of the latter connects with the make-alive electrode 24 of rectifier A, the two control tubes a and a' being in series, require simultaneous excitation for conductivity in order that current flow may be initiated between cathode and make-alive electrode of the particular rectifier tube with which they are associated. The conductivity of tubes a and a' is controlled by the bias voltage supplied to their grid electrodes 23 and 23', respectively, as will be described hereafter. The second rectifier B of group I is controlled in a similar manner as rectifier A by the tubes b and b'. The anode 25 of tube b is connected to the anode 12 of the rectifier B. The cathode 26 of the tube b and the anode 25' of the tube b' are interconnected and the cathode 26' thereof is connected to the make-alive electrode 24' of the rectifier B. The circuit between one-half of the secondary winding 5 of the transformer 4 and one terminal of the load 7 is completed by conductor 27 connecting to the cathode 10' of the rectifier B and conductor 16 connected to the cathode 10 of rectifier A whereby for both directions of current flow one of the rectifiers of group I are in series between the load and one-half of the power transformer secondary.

The other half of the secondary winding 5 which supplies the load 7 through group II of the rectifiers is arranged in a manner identical with group I. Rectifier C has its anode 15 connected to the cathode 13 of rectifier D, and vice versa, the anode 15 of the latter connects the cathode 13 of the former. Control tubes c and c' are connected between make-alive electrode 28 and anode 15 of rectifier C, the anode 29 of tube c being connected to the anode 15 of rectifier C, the cathode 30 of tube c with the anode 29' of tube c', the cathode 30' of which connects with the make-alive electrode 28 of rectifier C. Similarly, the anode 31 of control tube d connects with the anode 15 of rectifier D, the cathode 32 of tube d with the anode 31 of the tube d', the cathode 32' of which connects with the make-alive electrode 28' of rectifier D.

The grids of the various control tubes are supplied with the necessary control voltage which is derived from a plurality of secondary windings of two transformers. The primary winding 33 of one of these transformers, indicated here as transformer 34 is connected to the alternating current supply by means of conductors 35 and 35'. The primary winding 36 of the transformer 37 is supplied with the suitable high frequency voltage derived from a supply, such as a vacuum tube oscillator, indicated here by a conventional square. The purpose of this oscillator is to furnish control voltage for biasing the grids of the control tubes; hence its power output may be comparatively little, as the grid current of the control tubes is exceedingly small. The frequency of the oscillator is the frequency which will be utilized for the excitation of the load circuit 7 comprising the inductance 8 and capacity 9. As an example, the frequency chosen here is shown to be 1,000 cycles. Higher frequencies may as well be employed in the same manner. The choice of frequency is governed by the particular industrial application of the apparatus and may be increased within such limits as is necessary for the arc formation and extinction of the type of rectifiers utilized. The control voltage of 60 cycles derived from the winding 38 is impressed between grid 23 and cathode 22 of the tube a. The winding 39 is connected between grid 40 and cathode 26 of the tube b. Similarly in group II the winding 41 furnishes bias potential between grid 42 and cathode 30 of tube c and the winding 43 for the grid 44 with respect to cathode 32 of tube d.

The high frequency control potentials are applied from winding 45 to the grid 23 and cathode 22 of tube a'; from the winding 46 to grid 40', cathode 26 of control tube b' of group I. In group II from winding 47 to the grid 42', cathode 30' of control tube c', and from winding 48 to the grid 44', cathode 32' of control tube d'. The connection to the various control grids of the control tubes bears a certain phase relation and connections are so made that a desired phase relation shall be obtained between the various tubes. The function of both control sources, the voltages of which are distributed by the secondary windings of the transformers 34 and 37 will be understood from the following description of the operation of the circuit.

In order to follow the current in the various circuits, let it be assumed that one-half cycle of the commercial frequency is taken, at which time the windings 38, 39, 41 and 43 will have a polarity as indicated by plus and minus signs on the drawing. Within that particular one-half cycle, the 1000 cycle source will undergo 167⅔ reversals of current. The polarity of the windings 45, 46, 47 and 48 are marked considering one-half cycle of the 1000 cycle frequency source. Following the circuit of the primary input, namely the alternator 1, let it be assumed also that at the particular half-cycle considered, the terminals of the secondary winding will have the polarity as indicated on the drawing, the left-hand side being positive and the right-hand side negative. Under such conditions, the cathode 10 of the rectifier B will be positive whereas the anode 12 will be negative which will not permit a state of conductivity in this particular tube. At the same time, however, rectifier A due to the interconnection of its anode 12 with the cathode 10' of the rectifier B, will have proper polarity, the anode 12 being positive and the cathode 10 negative. To initiate conductivity, the make-alive electrode must be in a circuit which will carry current between anode 12, the make-alive electrode 24 and cathode 10. It is seen that control tube a receives a positive potential on its grid 23 with respect to its cathode 22 from the winding 38. During the half-cycle of operation at this instant, the space current of this tube would conduct a current from the anode 12 to the make-alive electrode 24 provided that the second control tube a' is also conductively biased. As can be seen from the winding 45 of the transformer 37, the grid 23 of the control tube a' has a positive bias for one-half cycle of the thousand cycle frequency source.

A better understanding can be obtained by considering now Fig. 2. The curve herein shows the operation of the conducting rectifier tube, in this particular instance, the rectifier A. For the duration of one-half cycle of the commercial frequency, the control tube a remains biased for conductivity. This conductivity in the circuit between the anode 12 and the make-alive electrode 24 however, is interrupted at each half cycle of the control frequency source supplied by the oscillator. The descending curve e shows the current through the rectifier A in the beginning of the half cycle of the 60-cycle period and the return to zero is shown by line F for one-half cycle of the thousand cycle period. For the next half cycles of the thousand cycle period, and within the same half cycle of the 60-cycle period, yet in the reverse direction, the current is supplied from rectifier C, the anode of which is positive with respect to the cathode as that of rectifier A in group I. The control tubes associated with rectifier C, namely tube c, is biased for conductivity during the particular half cycle under consideration of the commercial frequency, similarly as control tubes a. The grid of tube c', however, becomes positive by the second half cycle of the thousand cycle control frequency. By comparing the control of the grid 23 of tube a' and the grid 42' of tube c', it will be seen that conductivity condition of these tubes reverses at one-half cycle of the control frequency within one-half cycle of the commercial 60-cycle frequency. The result of this reversal of excitation of the control frequency is a somewhat distorted thousand cycle current through the rectifiers B and C modulated at 60 cycles or whatever the commercial frequency may be be.

Referring to Fig. 2 again, as stated before, the current supplied by the rectifier A will be the lines e and f and that supplied by the rectifier tube C will be g and h, increasing in amplitude as the commercial frequency sine wave increases and decreasing as it decreases within one-half cycle. During this period rectifiers D and B in groups I and II, respectively, remain inoperative, inasmuch as the control tubes associated therewith are biased to cut-off point for this half cycle of the commercial frequency, although the grid of the control tube b' and the grid of the control tube d' are conductively energized alternately at thousand cycles. As the commercial frequency voltage output decreases, the current output at a thousand cycles decreases with the modulation envelope.

In the next half cycle of the commercial frequency, the operation reverses, the polarity of control potentials supplied from the transformer 34 being reversed also. Now the rectifiers B and D will be alternately conductive at half cycles of the control frequency. The current curve continues in Fig. 2, the portion e' and f' being supplied by rectifier B and the portion g' and h' of rectifier D.

The characteristics of the ignitron rectifiers require that the current through it be brought definitely to zero before it can recover its insulating state where it is responsive to the impulses supplied to its control electrode. Therefore it is important that the ignitrons II, for example, be energized only after the current in ignitrons I is certainly zero. To make sure that this will be the case, the natural period of the load circuit formed by the inductance 8, and condensers 9, 19, 20 and 20' shall be made somewhat greater than the frequency of igniter excitation, in other words, the control frequency of thousand cycles. In this way, each rectifier becomes conducting a definite period of time after the current through the other rectifier becomes zero, and there is no possibility, due to slight changes of control frequency or other causes, of a rectifier being energized before the current in the preceding rectifier reaches zero.

Fig. 3 shows the resultant voltage and current curve with respect of condenser 19. The current of condenser 19 is shown by the curve i and the voltage across the condenser by the curve e. It will be seen that no current is flowing through the rectifier for the fraction of time marked Y. During this period of current pause, the last ignitron rectifier to carry current has an inverse voltage impressed upon it which is equal in magnitude to the excess of voltage across the condenser 19 over the supply voltage. This excess voltage exists because of the series relationship between the condenser 19, the heating coil 8 and the particular secondary winding of the transformer. It was found advantageous in practice to prevent this inverse voltage from being applied too rapidly to the particular ignitron rectifier. This is accomplished by the shunting condensers 20 and 20' in connection with the shunting condenser 9 of the inductance 8.

Fig. 4 shows the voltage between electrodes of the ignitron rectifiers resulting from the capacitive reactances in the circuit. The heavy lines indicate the voltage applied and the dotted lines the voltage wave-shape when the capacities 20 and 20' are omitted from the circuit.

The function of the capacities 20 and 20', together with the associated capacities in the circuit, is important in practical application for it was found that means must be provided to maintain the reactance predominantly capacitive in the load circuit. The latter should be resonant to a frequency somewhat higher than the actual control frequency of operation. The extent of deviation as to resonance from the control frequency in the load circuit determines the required pause of current through the load which may be different depending upon the type of rectifiers used. The type of tube utilized for controlling the actuation of the rectifiers is generally referred to in the art as Thyratron tubes, such for example as the commercially known Westinghouse type KU—676 tube.

I claim as my invention:

1. In a system for generating high frequency currents, a power supply of low frequency energy, an inductive load circuit connected thereto, a plurality of ignitron rectifiers arranged in groups of two and connected back-to-back whereby said groups are bilaterally conductive, said rectifiers being interposed between said circuit and said supply, a plurality of control means determining the sequence and rate of operation of said rectifiers and means for energizing certain of said control means at the frequency of said supply and others of said control means at the frequency desired to be generated.

2. In a system for generating high frequency currents, a power supply of low frequency energy, a tuned load circuit connected thereto, current rectifying devices of the ignitron type arranged in groups of bilateral conductivity interposed between said circuit and said supply, a plurality of control means certain of which determine the sequence and others the rate of operation of said devices, and means for energizing said sequence determining control means at the frequency of said supply and said rate determining control means at the frequence desired to be generated.

3. In a system for generating high frequency currents, a power supply of available commercial frequency, a load circuit comprising inductance and capacity in parallel connected thereto, current rectifying devices of the ignitron type arranged in groups of bilateral conductivity interposed between said circuit and said supply, each of said rectifiers including an anode, a cathode pool and a make-alive electrode, a plurality of control means connected between anode and make-alive electrodes of each of said devices, certain of which determine the sequence and others the rate of operation of said devices and means for energizing said sequence control means at the frequency of said supply and said rate determining means at the frequency desired to be generated.

4. In a high frequency electrical power system, a power supply circuit of commercial frequency, a main branch circuit including a power transformer having a divided secondary output circuit including between terminals a pair of ignitron rectifiers connected in bilateral relation of conductivity, each of said rectifiers having a cathode, an anode and a make-alive electrode, a load circuit symmetrically disposed between branches of said divided output circuit, a control circuit for alternate sequential energization of said rectifiers comprising a shunt path of variable conductivity between anode and make-alive electrodes of each of said rectifiers, means for initiating conductivity in certain of said shunt paths at alternate half cycles of said commercial frequency and at alternate half cycles of another predetermined frequency higher than said commercial frequency and means for maintaining substantially unity power factor at said second frequency in said load circuit.

5. In a high frequency electrical power system, a power supply circuit of commercial frequency, a main branch circuit supplied therefrom including a power transformer having a divided secondary output circuit including between output terminals pairs of ignitron rectifiers each having an anode, a cathode and a make-alive electrode, current conductive connections between cathode of one rectifier and anode of another rectifier, respectively, in each of said pairs and a connection between the cathode of one of said pairs and the cathode of another rectifier in another of said pairs, a load circuit comprising inductance and capacity disposed symmetrically between said divided output circuit and said connection between opposite pairs of rectifiers, means for controlling the operation of said rectifiers comprising a pair of electron discharge devices arranged in series between anode and make-alive electrodes of each of said rectifiers in space-current conductive relation therebetween, each of said discharge devices having anode, cathode and control electrodes, means for biasing certain of said control electrodes thereby causing space current flow at one-half cycle of said commercial frequency and others of said control electrodes causing space current flow at succeeding half-cycles of said commercial frequency whereby conductivity of said rectifiers alternates between individual rectifiers in each of said pairs and means for controlling the duration of conductivity of each of said rectifiers at a predetermined frequency higher than said commercial frequency alternately within each half cycle of operation.

6. The arrangement in accordance with claim 5 wherein said biasing means for certain of said control electrodes comprises a transformer having a primary winding supplied from said commercial frequency and a plurality of secondary windings each of which is connected between control electrode and cathode of one of said control tubes in opposite phase relation between tubes associated with one group of rectifiers.

7. The arrangement in accordance with claim 13 wherein said oscillations of higher frequency are distributed between control electrodes of electron discharge devices by means of a transformer having a primary winding which is energized from said source of oscillations and a plurality of secondary windings each of which is connected between cathode and control electrode of one of said discharge devices in said series arrangement in such manner as to have proper polarity for space conduction of one of said devices in each group of said rectifiers.

8. In combination a first electric discharge valve of the arc-like type having a plurality of principal electrodes and a control electrode, means for impressing a first periodic potential between said principal electrodes, a second electric discharge valve having a plurality of principal electrodes and a control electrode, means for connecting said principal electrodes of said second valve between a principal electrode and said control electrode of said first valve and means for impressing a second periodic potential of greater frequency than said first potential between said control electrode and a principal electrode of said second valve.

9. In combination, an ignitron having a plurality of principal electrodes and an ignition electrode in contact with one of said principal electrodes, means for impressing a first periodic potential between said principal electrodes, an electric discharge valve having a plurality of principal electrodes and a control electrode, means for connecting said principal electrodes of said valve between a principal electrode of said ignitron other than said one principal electrode and said ignition electrode and means for impressing a second periodic potential of greater frequency than said first potential between said control electrode and a principal electrode of said valve.

10. In combination an ignitron having an anode, a cathode and an ignition electrode, means for impressing a first alternating potential between said anode and cathode, an electric discharge valve having an anode, a cathode and a control electrode, means for connecting the anode of said valve to the anode of said ignitron and the cathode of said valve to said ignition electrode and means for impressing a second alternating potential of a frequency higher than that of said first potential between said control electrode and said cathode of said first valve.

11. In combination a main electric discharge device having a control electrode and a plurality of principal electrodes, means for impressing a potential between said principal electrodes, a first auxiliary electric discharge device having a control electrode and a plurality of principal electrodes, a second electric discharge device having a control electrode and a plurality of principal electrodes, means for connecting the principal electrodes of said auxiliary devices in series between a principal electrode and said control electrode of said main device, means for impressing a first periodic potential between said control electrode and a principal electrode of said first auxiliary device and means for impressing a periodic potential of frequency greater than the frequency of said first potential between the central electrode and a principal electrode of said second device.

12. In combination an ignitron having an anode, a cathode and an ignition electrode, means for impressing a first alternating potential between said anode and cathode, first and second electric discharge devices each having an anode, a cathode and a control electrode, means for connecting the anode of said first device to the anode of said ignitron, the cathode of said first device to the anode of said second device and the cathode of said second device to said ignition electrode, means for impressing an alternating potential of the same frequency as said first potential between said control electrode and said cathode of one of said devices and means for impressing an alternating potential of a frequency greater than the frequency of said first potential between the control electrode and the cathode of said other device.

13. In a high frequency electrical power system, a power supply circuit of commercial frequency, a main branch circuit supplied therefrom including a power transformer having a divided secondary output circuit including between output terminals pairs of ignitron rectifiers each having an anode, a cathode and a make-alive electrode, current conductive connections between the cathode of one rectifier and anode of another rectifier, respectively, in each of said pairs and a connection between the cathode of one of said pairs and the cathode of another rectifier in another of said pairs, a load circuit comprising inductance and capacity disposed symmetrically between said divided output circuit and said connection between opposite pairs of rectifiers, means for controlling the operation of said rectifiers comprising a pair of electron discharge devices arranged in series between anode and make-alive electrodes of each of said rectifiers in space-current conductive relation therebetween, each of said discharge devices having anode, cathode and control electrodes, means for biasing the control electrodes of certain of said discharge devices thereby causing space current flow at one-half cycle of said commercial frequency and the control electrodes of certain others of said discharge devices causing space current flow at succeeding half-cycles of said commercial frequency whereby conductivity of said rectifiers alternates between individual rectifiers in each of said pairs and means for controlling the duration of conductivity of each of said rectifiers at a predetermined frequency higher than said commercial frequency alternately within each half cycle of operation, said means for controlling the duration of conductivity of said rectifiers comprising the remainder of said electron discharge devices in said series arrangement between anode and make-alive electrode of said rectifiers, the control electrode of said devices being energized from a source of oscillations of a higher frequency than said commercial frequency, said oscillations being impressed upon said control electrodes in opposite phase relation between rectifiers in one of said groups and in aiding phase relation between conducting rectifiers of said groups.

14. The arrangement in accordance with claim 13 wherein said biasing means for certain of said control electrodes comprises a transformer having a primary winding supplied from said commercial frequency and a plurality of secondary windings, each of which is connected between control electrode and cathode of one of said control tubes in opposite phase relation between tubes associated with one group of rectifiers.

JOSEPH SLEPIAN.